(12) United States Patent  
Melikian

(10) Patent No.: US 8,842,191 B2
(45) Date of Patent: Sep. 23, 2014

(54) SYSTEM AND METHOD FOR VISUAL RECOGNITION

(75) Inventor: Simon Melikian, Westlake, OH (US)

(73) Assignee: Recognition Robotics, Inc., Elyria, OH (US)

( * ) Notice: Subject to any disclaimer, the term of this patent is extended or adjusted under 35 U.S.C. 154(b) by 612 days.

(21) Appl. No.: 12/793,339

(22) Filed: Jun. 3, 2010

(65) Prior Publication Data

US 2011/0298939 A1 Dec. 8, 2011

(51) Int. Cl.
*H04N 5/228* (2006.01)
*G06K 9/46* (2006.01)
*G06K 9/66* (2006.01)

(52) U.S. Cl.
CPC .................... *G06K 9/4628* (2013.01); *G06K 9/4671* (2013.01)
USPC ........................ 348/222.1; 348/190

(58) Field of Classification Search
USPC ............. 348/86–92, 82, 222.1; 382/100, 152, 382/181, 190, 195, 204, 209–213
See application file for complete search history.

(56) References Cited

U.S. PATENT DOCUMENTS

| | | | |
|---|---|---|---|
| 4,761,596 A | 8/1988 | Nio et al. | |
| 5,809,171 A * | 9/1998 | Neff et al. | 382/209 |
| 6,044,168 A * | 3/2000 | Tuceryan et al. | 382/118 |
| 6,046,431 A | 4/2000 | Beattie | |
| 6,236,896 B1 | 5/2001 | Watanabe et al. | |
| 6,272,244 B1 | 8/2001 | Takahashi et al. | |
| 7,113,652 B2 * | 9/2006 | Reiners | 382/291 |
| 7,206,449 B2 | 4/2007 | Raskar et al. | |
| 7,380,697 B2 | 6/2008 | Seki et al. | |
| 7,450,740 B2 | 11/2008 | Shah et al. | |
| 7,570,795 B2 | 8/2009 | Yu et al. | |
| 7,623,736 B2 | 11/2009 | Viswanathan | |
| 2005/0213818 A1 * | 9/2005 | Suzuki et al. | 382/190 |
| 2005/0252898 A1 | 11/2005 | Blechinger et al. | |
| 2006/0107508 A1 | 5/2006 | Bonse et al. | |
| 2006/0204079 A1 * | 9/2006 | Yamaguchi | 382/154 |
| 2007/0075048 A1 | 4/2007 | Kunisaki et al. | |
| 2007/0179918 A1 | 8/2007 | Heisele et al. | |
| 2008/0240511 A1 | 10/2008 | Ban et al. | |
| 2008/0262929 A1 | 10/2008 | Behr | |
| 2008/0273761 A1 * | 11/2008 | Kawata | 382/115 |
| 2009/0220156 A1 * | 9/2009 | Ito et al. | 382/201 |
| 2009/0249606 A1 | 10/2009 | Diez et al. | |
| 2010/0253787 A1 * | 10/2010 | Grant | 348/207.1 |
| 2011/0072047 A1 | 3/2011 | Wang et al. | |
| 2011/0092249 A1 * | 4/2011 | Evanitsky | 455/556.1 |
| 2011/0299770 A1 * | 12/2011 | Vaddadi et al. | 382/165 |

* cited by examiner

*Primary Examiner* — Roberto Velez
*Assistant Examiner* — Tuan Le
(74) *Attorney, Agent, or Firm* — Rankin, Hill & Clark LLP

(57) ABSTRACT

A method for generating a signal based on a visual image includes photographing a target object with a digital camera to obtain a target image; receiving the target image into a processor that is in communication with the camera; cross-correlating the target image with a structure having a variety of scales across the target image; and based on cross-correlating the target image, generating a signal for output on a device associated with the camera. A visual recognition system is also disclosed.

15 Claims, 17 Drawing Sheets

Cone-like structure at different scale

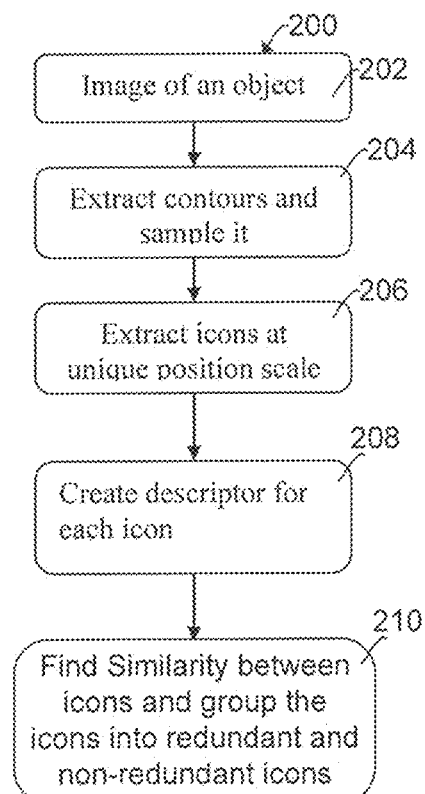
FIG. 12
FIG. 8A
FIG. 8B
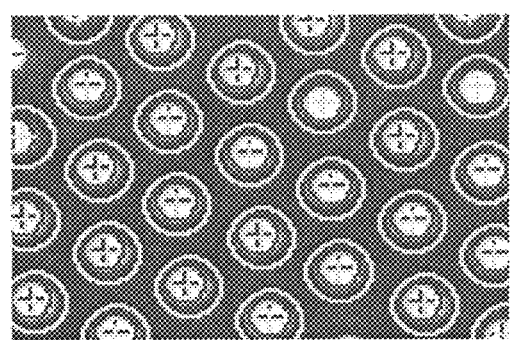
FIG. 8C

SYSTEM AND METHOD FOR VISUAL RECOGNITION

TECHNICAL FIELD OF THE INVENTION

The present invention relates to the field of computer vision, and more particularly, to a system and method for visual recognition for use in a wide variety of applications.

DESCRIPTION OF THE RELATED ART

Computer vision generally relates to the theory and technology for building artificial systems that obtain information from images or multi-dimensional data. As used herein "information" means anything that enables a decision to be fully and/or partially based. Exemplary computer vision applications include: visual object recognition and scene interpretation, particularly for image retrieval, video indexing, controlling processes (e.g. an industrial robot or autonomous vehicle such as unmanned aerial/ground/see vehicle), detecting events (e.g. for visual surveillance), organizing information (e.g. for indexing databases of images and image sequences), Image based internet search (e.g., searching for similar image on the Internet), modeling objects or environments (e.g. medical image analysis or topographical modeling), interaction (e.g. as the input to a device for computer-human interaction), etc.

A goal of computer vision is to make a computer truly "see" just like humans do. Understanding the content of everyday images and videos is one of the fundamental challenges of computer vision. In order to make a computer "see" in an unconstrained environment an extraordinary amount of computational power, perhaps on the order of 1015 operations per second likely is needed. Even if such a speed was possible in a commercial computer vision system, it is difficult to perform rapid visual searches in unconstrained, natural environments.

To make search and recognition tasks tractable in commercial computer vision, designers typically limit the task's visual complexity. This may be done in a variety of ways. For example, the vision system may be set up to view and recognize only one or a small class of objects. Second, the presentation (position, orientation, size, view, etc.) of these objects is strictly controlled. Thus, the object variability is limited to the point that the vast majority of variables are eliminated and the search can be implemented with reasonable cost in terms of both computing time and money.

Computer vision systems generally lack the knowledge needed to constrain and interpret a general visual search (e.g., searches performed in an uncontrolled environment). Therefore, practical computer vision search requires the designer to drastically restrict what the vision system sees and to add a priori knowledge about what it will see so that it can interpret the result. Thus, a major drawback to computer vision in real world applications is the time, money and specialized knowledge needed for such applications to be adequately performed.

The evolution of computer vision in the last twenty years was driven by improvements in hardware and algorithms. A variety of computer vision methods have been developed for image detection (also referred to herein as pattern recognition). These techniques include, for example, using binary images to represent gray scale images, normalized grayscale correlation, blob analysis, geometric based search and recognition, contour based search, affine invariant constellation based recognition, corner detection, salient icon detection, scale invariant feature transform, etc.

SUMMARY

A strong need exists in the art of computer vision to recognize objects in an image or image sequence similar to vision in human beings. For example, in an airport, an unmanned vehicle needs to recognize other vehicles and obstacles so it can avoid and/or maneuver through the airport. In an unmanned vehicle or other robotic vision application, the robotic application generally needs to "see" the pathway and navigate autonomously or land autonomously. A need also exists for devices that aid sight impaired individuals.

In visual recognition, achieving invariance to object presentation (position, orientation, distance (scale), and perspective), lighting, occlusion and background is challenging. Aspects of the present invention provide excellent invariance to object presentation, lighting, occlusion and background and generalization for true object recognition.

The human brain processes visual information associated with objects with full independency of the position, orientation, distance (scale), and perspective. For example, if a human being views a "soda pop can", the human can recognize it regardless of the distance and/or orientation (e.g., distance from can, rotation, tipped, tilted, etc.). The brain essentially "normalizes the view". Humans are capable of learning a large number of objects and easily retrieve the learned objects. Aspects of the present invention allow learning virtually an unlimited number of objects and recognizing any one of these learned object(s) regardless of object presentation. This is analogous to human visual recognition capability. For example, aspects of the invention enables the recognition of hundreds of trained objects very quickly (e.g., in less than a second) and fundamentally has no limit in learning and recognizing millions of objects. This capability stems from the ability to extract the same icons (image patches) from an image of an object regardless of distance, rotation, presentation that the object is in relation to the viewer and/or the device acquiring the image or series of images.

Aspects of the invention relate to extracting unique points (e.g., x and y coordinate points) in an image. Each one of these unique points has its own unique scale (e.g., size) and orientation that is related directly to the presentation of the object. Having scale and orientation information measured per unique point enables visual recognition that is fully invariant to presentation. In other words, when an object is closer, farther, rotated, tipped, and/or tilted, these unique points have similar relative locations to the object and a unique scale that is related to how close/far the object is and rotation values that are related directly to the object planar rotation. Basically these unique points "normalize the view" of the object.

An icon (image patch) from an image of an object is extracted from each of these unique points. The size of the icon corresponds to the scale of the unique point. And the angle of the icon is the angle of the unique point. After extraction of the various icons, an object becomes a collection of icons. Each of these icons is un-rotated by icon angle and resited to a constant size so it can be compared (distance measure such as absolute difference) one-to-one with other icon (also referred to herein as "normalized". It has been determined that the icons are virtually identical regardless of object presentation. In other words, the icons (image patches) are the same whether the object is close or far, rotated, tilted, and/or tipped. One of the unique properties of these icons is their stability over scale and angle. Comparing an icon for similarity may also include color information. Generally, when comparing two icons, each icon may also be intensity-normalized.

Searching for an object in database of learned object's images becomes a search of vectors associated with learned object's images. Indexing techniques are one way represent an image for searching.

Computing geometric transformation between a learned object and a found object is done by computing the transformation between the corresponding learned icon's position and found icon's position, as discussed below. The transformation matrix between learned object and found object is computed using a perspective matrix using least square of all corresponding icons positions or by picking two sets of quad icons position from the learned and found objects. Based on rigid body assumptions, every set of four icons can compute a perspective matrix. Many sets of four icons give the same transformation, which provides a robust measure of correct match, also referred to herein as, measure redundancy, as discussed below.

One aspect of the present invention relates to a method for visual recognition of at least one object in an image, the method comprising: providing an image in an electronic format, wherein the image includes at least one object to be learned; generating extremum information associated with the image by cross-correlating at least one structure across at least a portion of the image, wherein the extremum information includes at least one coordinate point associated with cross-correlating the at least one structure across the image; extracting at least one icon from the image, wherein the icon includes the coordinate point associated with the extremum information; determining an angle associated with the at least one icon; normalizing the icon to a fixed size; and storing icon information in a computer readable form, wherein the icon information includes image values associated with at least a portion of the icon; the at least one coordinate point associated with the extremum information; and the angle associated with the at least one icon.

Another aspect of the invention relates to a method for matching a learned object with a target object, the method comprising: providing at least one learned object and at least one target object, wherein the learned object and the target object; extracting unique points from the target object, wherein the unique points are generated from extremum information obtained from the target image by cross-correlating at least one structure across the target image; extracting an icon of the target image corresponding to each of the unique points; determining an angle associated with the at least one icon; normalizing the extracted icon; and determining if the extracted icon from the target images matches a learned object.

Another aspect of the invention relates to a program stored on a machine readable medium, the program being suitable for use in matching a learned object with a target object, wherein when the program is loaded in memory of an associated computer and executed, causes extracting unique points from the target object, wherein the unique points are generated from extremum information obtained from the target image by cross-correlating at least one structure across the target image; extracting an icon of the target image corresponding to each of the unique points; determining an angle associated with the at least one icon; normalizing the extracted icon; and determining if the extracted icon from the target images matches the learned object.

An example of a method for generating a signal based on a visual image includes photographing a target object with a digital camera to obtain a target image; receiving the target image into a processor that is in communication with the camera; cross-correlating the target image with a structure having a variety of scales across the target image; and based on cross-correlating the target image, generating a signal for output on a device associated with the camera.

An example of a visual recognition system includes a camera, an interface, a speaker, a speaker driver, a memory and a processor. The interface is configured for receiving commands from an operator of the recognition system. The speaker driver is in communication with the speaker. The processor is in electrical communication with the camera, the interface, the speaker driver and the memory. The processor is programmed so as to receive a target image of a target object from the camera, to cross-correlate the target image with a structure, and to extract icons from the target image.

Another example of a visual recognition system includes a camera, an interface, a speaker, a speaker driver, a memory and a processor. The interface is configured for receiving commands from an operator of the recognition system. The speaker driver is in communication with the speaker. The processor is in electrical communication with the camera, the interface, the speaker driver and the memory. The processor is programmed so as to receive a target image of a target object from the camera, to cross-correlate the target image with a structure, and to output a signal to the speaker driver. The signal includes an indication of the pattern on the target object based on cross-correlating the target image with the structure.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

It should be emphasized that the term "comprise/comprising" when used in this specification is taken to specify the presence of stated features, integers, steps or components but does not preclude the presence or addition of one or more other features, integer, steps, components or groups thereof.

BRIEF DESCRIPTION OF THE DRAWINGS

The foregoing and other embodiments of the invention are hereinafter discussed with reference to the drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

FIGS. 8A-8C illustrate exemplary structures in accordance with aspects of the present invention.

FIG. 9-13 are exemplary methods in accordance with aspects of the present invention.

DETAILED DESCRIPTION OF EMBODIMENTS

Figure 1A:
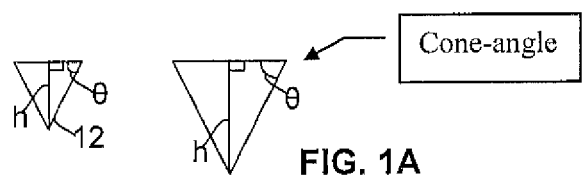
FIGS. 1A-1D is an exemplary illustration of a structure and correlation method in accordance with aspects of the present invention.

The present invention is directed to a system and method for pattern identification of a learned image (or learned pattern) in a target image. Unique and stable points (e.g., x and y coordinate points) are extracted from an image of an object, regardless of object presentation. The uniqueness of the extracted points comes from the fact that these points have the same relative position in the object regardless of distance, orientation (e.g., tip, tilt, rotation, etc.) and illumination of the object from the viewer or viewing device. In other words, the extracted points are invariant to object presentation.

Early computer vision algorithms generally used an image subtraction method (also referred to as golden template matching) as a primitive method of recognition. Image subtraction is a form of distance measure between two images. For the image subtraction method to work, the object in the learned image has to be nearly identical to the object in the target (scene) image. For example, the object generally has to be in the same position, same scale, same planar angle, etc. as the learned object. Any shift in location or other transformations would produce a false result. Such conditions were generally needed because the subtraction method simply subtracted pixel values having coordinates in one image with pixel values located at corresponding coordinates in another image.

If a method can find regions in an object image that are the same regardless of object presentation, it is conceivable that the golden template concept may be used to recognize regions of that object, which could result in recognizing the entire object. Prior methods to find these unique points and associated icons produced either unstable points in position, unstable scale, and/or unstable angle. The prior methods produced few inliers and majority of outliers, which makes pattern recognition generally problematic. Researchers in academia have experimented with several types of these unique points. Example of some of the famous type of these points are, Harris-Corner-Detector, Harris-Laplace, Laplacian-of-Gaussian, SIFT (Difference of Gaussian). Generally these detectors lack stability in position, scale and angle, which produces various problems during the recognition process. For example, these prior methods produce hundreds and/or thousands of unique points and only a handful of such points may survive from one object position to another to aid in pattern recognition.

An invariant point in an image generally needs to have the characteristic of extremum for some metric. For example, in a one dimensional signal, such as a parabola, the peak point of a parabola is an invariant point regardless to the parabola's parameters (e.g., regardless to how wide, narrow, shifted, or rotated a parabola is).

Referring to FIGS. 1A-1D, an exemplary method 10 of extracting unique and highly stable points (e.g., x and y coordinate points) is illustrated. These points are highly stable in position, scale, and angle. Accordingly, such points are referred to herein as scale rotation invariant (SRI) points (and/or SRIP). One way of extracting the SRI points is by cross correlating the object image by a structure 12. Cross-correlation is generally a measure of the similarity of two signals. Cross-correlation is commonly used to find features in an unknown signal by comparing it to a known one. It is a function of the relative time between the signals and is sometimes called the sliding dot product.

Structure 12 may be circular, conic or Gaussian shape. In one embodiment, the structure 12 is a cone-like structure. Referring to FIG. 1A, the cone-like structure 12 is illustrated in two dimensions.

The cone-like structure 12 has a cone angle 6 that generally corresponds to the height (h) of the structure 12. For example, SRI points generally have very interesting properties that aid in recognition. Based on correlation score between cone-like structure (or any other desired structure) and the image: a correlation score close to 1.0 identifies round structures; a correlation score of about 0.5 identifies strip like structures; and a correlation score of about 0.7 identifies an end of strip like structure. One of ordinary skill in the art will readily appreciate that the shape of the structure chosen may correspond to a change in correlation score for the identified structure.

Figure 1B:
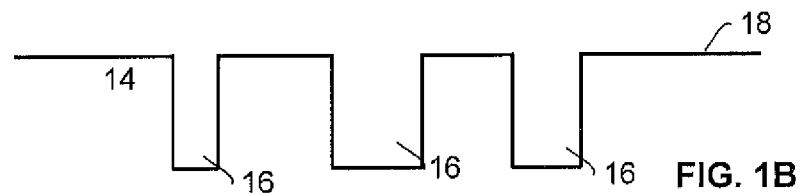

Referring to FIG. 1B, a "steel plate" 14 is illustrated. The steel plate 14 has holes 16 of varying sizes along a surface 18. The steel plate is analogous to the object image or scene image.

Figure 1C:
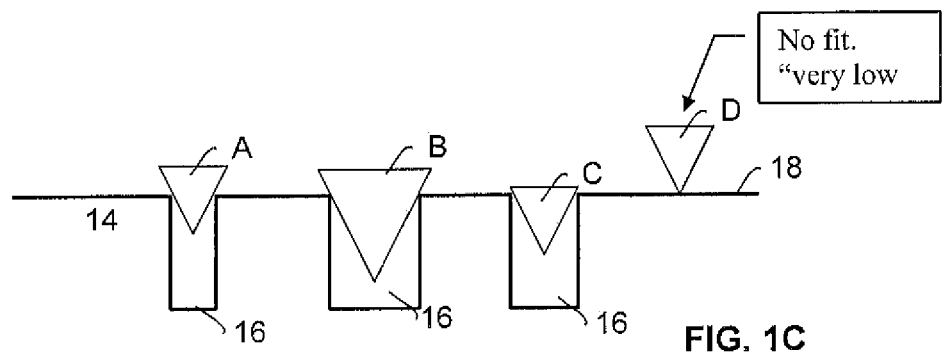

The structure 12 is attempted to be "inserted" into the steel plate 14 in a scanned manner (e.g., one pixel after another pixel). As shown in FIG. 1C, the cone-like structure 12 is illustrated being inserted into a "steel plate" 14, for purposes of illustration. One goal is to find holes (or other meaningful structure) by poking (in a scanned way) (i.e., pixel by pixel and/or group of pixels by group of pixels) the structure 12 (e.g., a cone-shape pin) into the steel plate. The structure 12 (e.g., the cone-like shape is the known cross-correlation image) is used to generate the unique points. If a point on the surface 18 does not contain a hole, the pin does not go into the steel plate 14, which yields a low score correlation match (e.g., see "D" in FIG. 1C). Referring to FIG. 1C, if structure 12 is inserted (or poked) into a hole, the cone would go in some distance depending on the pin conic size and hole size in the plate. For example at "A", the structure 12 extends into the hole 16 approximately half-way. At "C", the structure 12, which is substantially the same size as the structure at "A", extends almost fully into the hole. Accordingly, "C" has a higher correlation than "A". Also, note that at "B", a larger structure 12 than was used at "A" and "C" is illustrated. The larger structure extends approximately 80% into the hole 16, at "B". If the same sized structure used at "A" and "C" were inserted into the hole at "B", the structure would hit the bottom without touching any of the walls associated with the hole 16 and, therefore, not have a strong correlation, no extremum. In one embodiment, it is desirable to cross-correlate an image with structures having a variety of scales in order to identify all or at least a portion of the extremum information available on the image.

Figure 1D:
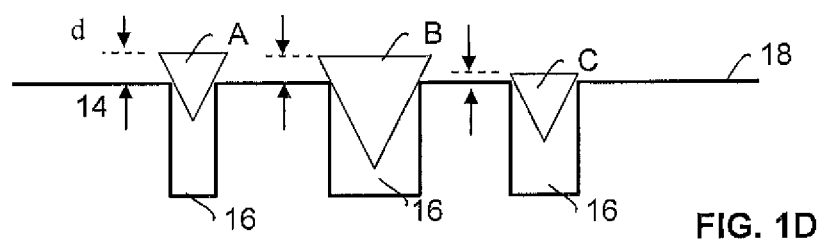

Referring to FIG. 1D, the amount that the cone goes inside (e.g., correlation match score) is related to the structure, cone-angle, and the size of the hole, or the structure. For example, this can be view as a two dimensional frequency analysis of an image. The result of cross correlating a cone structure with the image at a different scale is a set of coordinate points (x,y) and unique radius (scale) for each of these points. The radius value is directly related to the scale of the image and to the size of the structure around the coordinate point.

Figure 2:
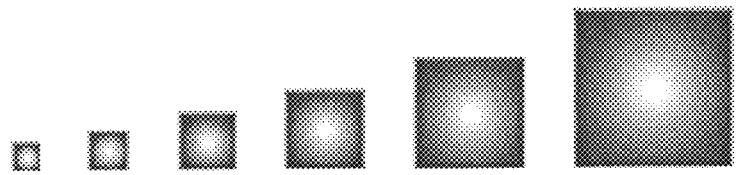
FIG. 2 is an exemplary illustration of a structure having various scales in accordance with aspect of the present invention.

FIG. 2 illustrates the cone-like structure 12 in a two-dimensional image for six different scales. The scale size may be any desirable size for each of the various structures used to identify the SRI points. The SRI points for each of the various structure sizes will generally vary when cross-correlated with an image. The collection of SRI points for all of the structure sizes is generally used to define the object, as discussed below. For example, the scale size of the structure 12 may vary from a point contact (e.g., 5×5 pixel) to the size of the image and/or object of interest. The gradations in color change correspond to the height of the cone-like structure 12.

FIGS. 3A-3G illustrate an exemplary image that has been cross-correlated with a structure 12 of varying cone size (scale) (e.g., cone-like structures illustrated in FIGS. 1 and 2). The exemplary image may be any digital image, a portion of an object or image, an electronic representation of an image, etc. As shown, in FIGS. 3A-3G, the image is a digital image of an object. It may be desirable for a machine to determine the precise location and/or orientation of one or more items (or patterns) in this scene. This information may be used in any desirable manner. For example, the information may be used so that a controller, a device, or other electronic device may properly interact with software that is capable of detecting optical objects in order to facilitate controlling, locating, assembling and/or processing information related to the item.

Once the image has been cross-correlated, a resulting set of unique points (also referred to herein as x and y coordinate points) and radius values (scale) for each of the points are obtained, as is illustrated by the white circles in each of the images. As stated above, any structure 12 may be used in accordance with aspects of the present invention. For example, a two dimensional Gaussian provided similar results as the cone-like structure. The cone-like structure 12 is utilized to find extremum in the object regardless of scale. This provides robust and reliable relative localization (e.g., x and y coordinate positions in the image), and scale.

Figure 3A:
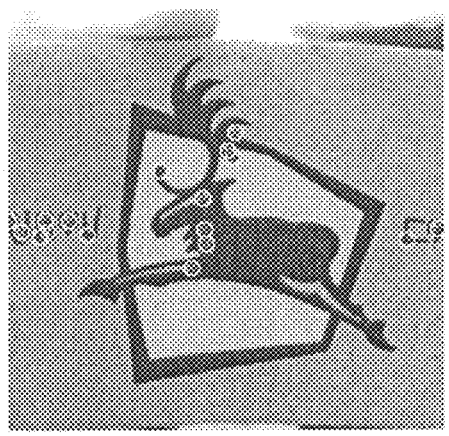
FIGS. 3A-3N illustrate correlation results and corresponding extremum information associated therewith in accordance with aspects of the present invention.
Figure 3H:
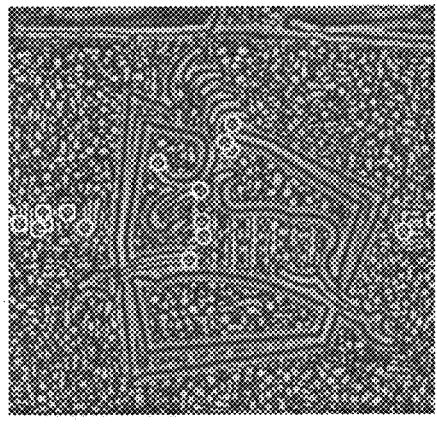
Figure 3B:
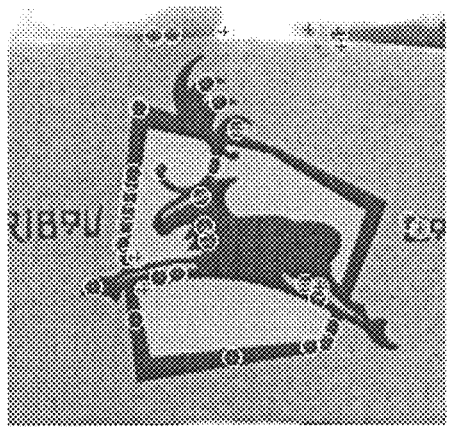
Figure 3I:
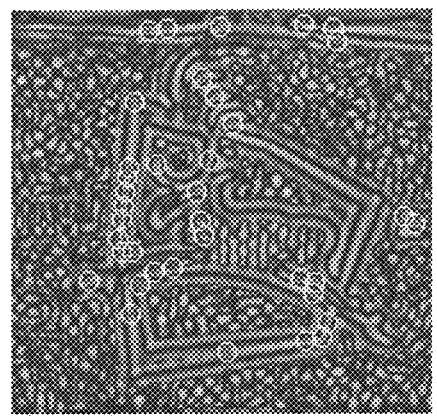
Figure 3C:
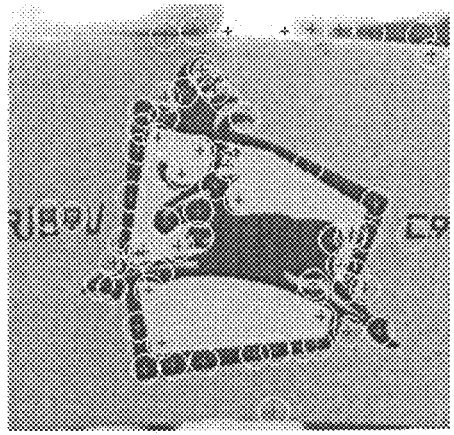
Figure 3J:
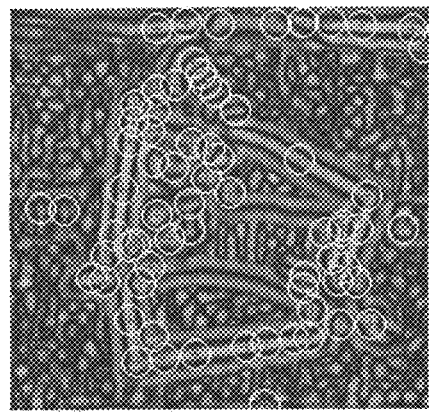
Figure 3D:
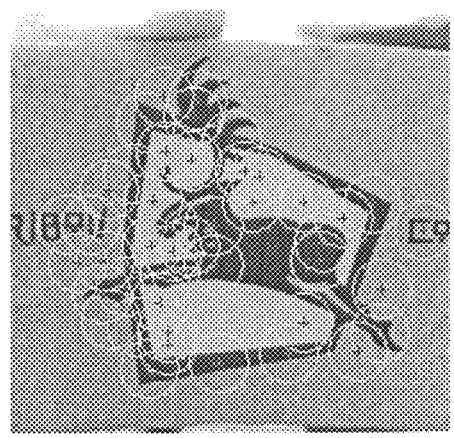
Figure 3K:
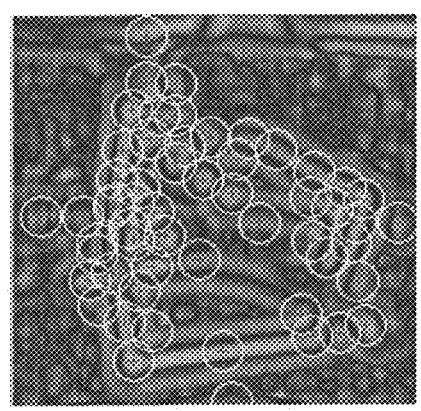
Figure 3E:
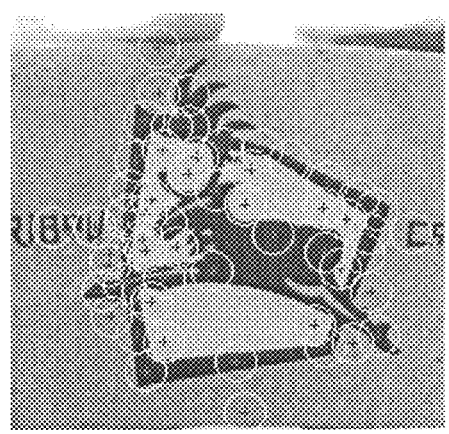
Figure 3L:
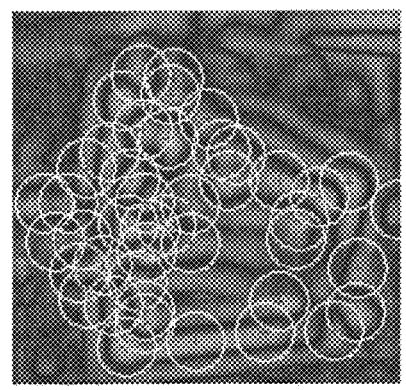
Figure 3F:
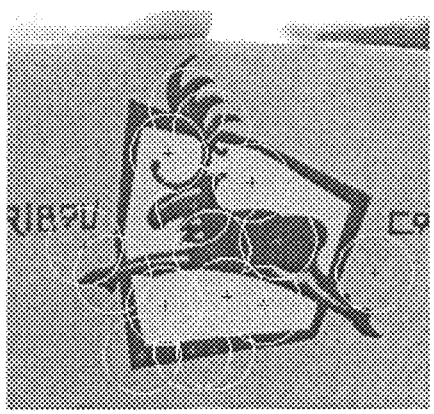
Figure 3M:
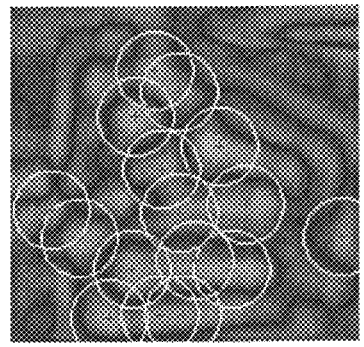
Figure 3G:
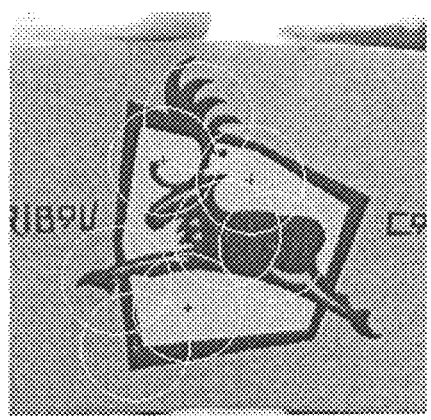
Figure 3N:
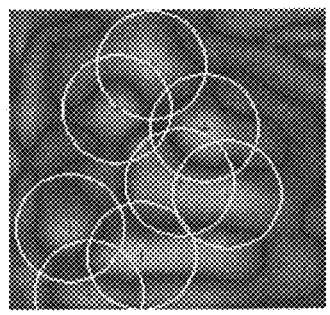

Once the correlation image is computed a peak detector is applied to find the coordinate of peaks in sub pixel form, as illustrated in FIGS. 3H-N. FIG. 3H identifies the extremum corresponding to FIG. 3A; FIG. 3I identifies the extremum corresponding to FIG. 3B; FIG. 3J identifies the extremum corresponding to FIG. 3C; FIG. 3K identifies the extremum corresponding to FIG. 3E; FIG. 3L identifies the extremum corresponding to FIG. 3D; FIG. 3M identifies the extremum corresponding to FIG. 3F; and FIG. 3N identifies the extremum corresponding to FIG. 3G. The cone-like structure 12 is a rotational invariant extremum detector for range of scales. In addition, the cone-like structure 12 also offers superior position localization regardless of scale.

Figure 4A:
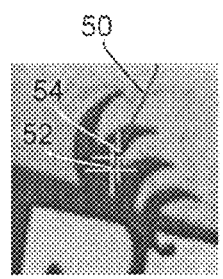
FIGS. 4A and 4B illustrate icon angle vectors in accordance with aspects of the present invention.
Figure 4B:
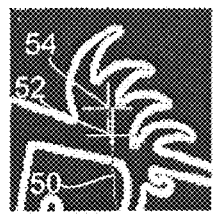

Once the unique points (e.g., coordinate values) are determined, an icon (image patch) is extracted from the associated at each of these coordinates. The icon size is proportional to the radius (scale) of the cone structure having a high cross-correlation match value. The angle of the icon 50 is computed from a vector between the unique point position 54 and the grayscale centroid position 52 of the icon at scale, as shown in FIGS. 4A and 4B. As shown in FIG. 4A, icon angle computation is based on the gray scale centroid using the raw image of the icon, for example. Icon angle computation may also be based on the edge detected image of the icon, as shown in FIG. 4B. The angle of the icon is the vector from the center of icon to the grayscale centroid. The grayscale centroid can also be applied on the raw image (e.g., such as Sobel or Canny edge detection).

Figure 5:
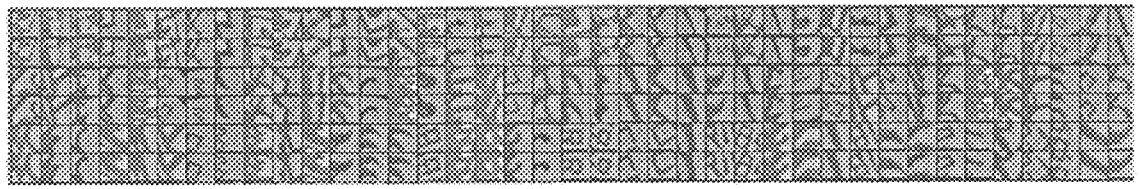
FIG. 5 is an exemplary illustration of normalized icons obtained in accordance with aspects of the present invention.
Figure 6A:
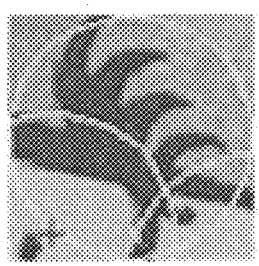
FIGS. 6A and 6B illustrate exemplary icons in accordance with aspects of the present invention.

Once extracted, each one of the icons is normalized to a fixed size, as shown in FIG. 5. FIG. 5 illustrates the set of icons extracted from the image at each coordinate point for each scale associated with the structure. For example, FIG. 5 illustrates a matrix of normalized icons. The purpose of normalizing these icons into constant size is to be able to compare them with other icons (for the purpose of finding similar icons in database of icons, thus similar objects), by simply computing the difference between the two images as in the "golden template matching". Another method to compare these icons is by creating descriptor vector and then comparing these descriptors using distance measure between vectors. For example, the icon of FIG. 6A may be described in descriptor vector format as:

6,17,22,23,16,0,0,11,3,26,25,3,0,0,20,20,6,5,4,10,5,60,0, 7,6,14,4,12,9,22,12,16.

Figure 6B:
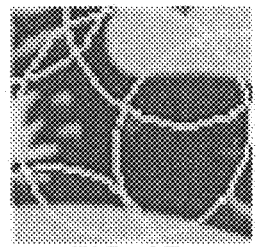

Likewise, the icon of FIG. 6B may be described in descriptor vector format as:

13,7,21,11,4,5,24,11,0,58,38,0,0,0,2,0,0,5,20,11,4,28,28, 1,7,6,0,0,0,84,1,0.

One of ordinary skill in the art will readily appreciate that there are many ways to compute icon descriptors (e.g., histogram of gradient angle, principle component analyses (PCA), etc.).

Figure 7A:
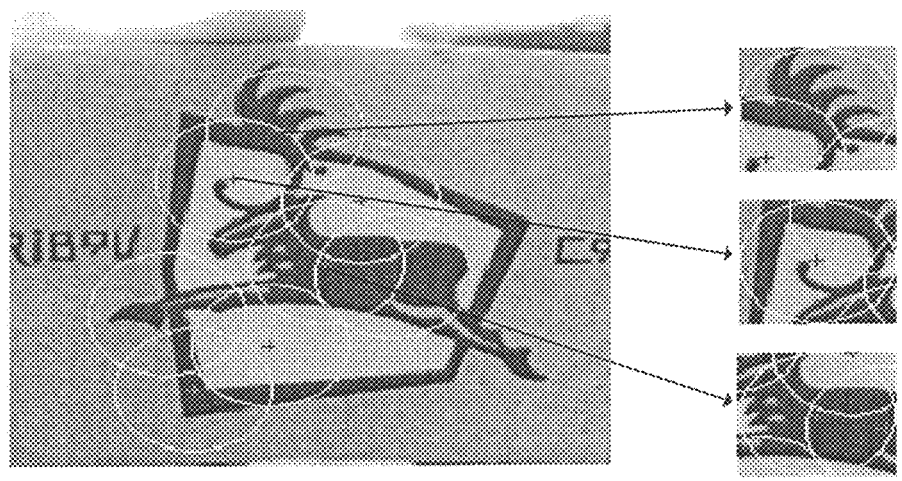
FIGS. 7A-7C illustrate exemplary icons in accordance with aspects of the present invention.
Figure 7B:
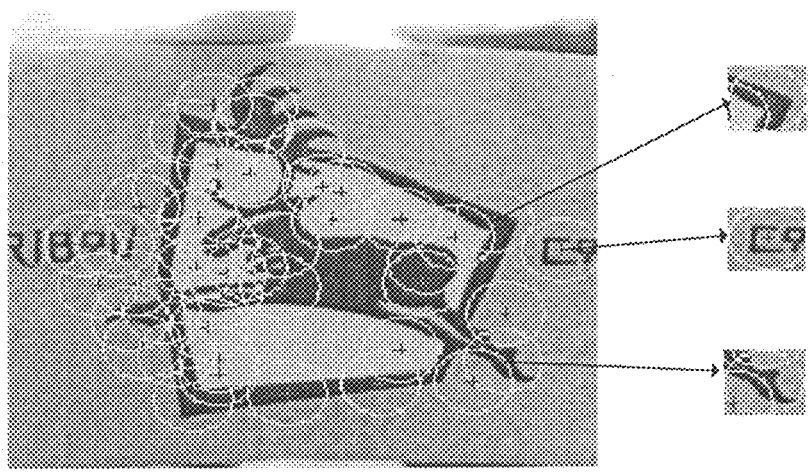
Figure 7C:
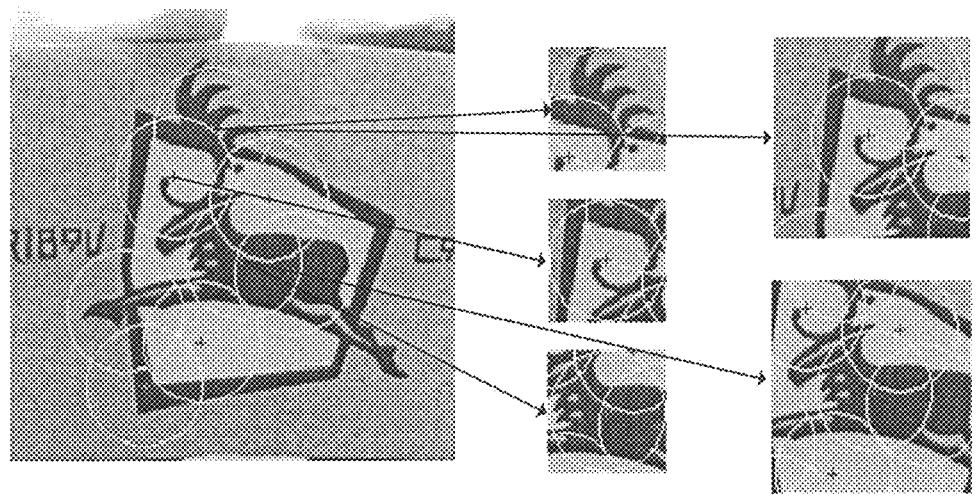

Each learned object may be described by a set of icons. Each icon generally includes one or more values, for example: (x,y) coordinate position, a size that correspond to the size of the image structure from which the icon originated from, and an angle. For example, FIGS. 7A-7C illustrates various icons extracted from a correlation of structures having various sizes. The spatial relation of these icons is insured by the outline of the object. These icons may be stored in any electronic storage device. For example, the icons may be stored in a database of icons that generally includes an identifier, which is tagged and/or otherwise associated to a specific learned object. In another embodiment, a descriptor associated with each of the icons is stored in a database or other suitable data storage medium. In another embodiment, icons may also be extracted at multiple-scale values that produce multiple icons per unique points, as opposed to extracting icons only at the cone-structure-scale. For example, if the cone-structure scale is 32×32 pixels, then extract icons at 32×32 pixels and 48×48 pixels, as illustrated in FIG. 7C. This method generally guarantees true correspondence and recognition from a very few number of icons. In fact, in many situations only one unique icon may be needed to determine recognition of the object.

FIGS. 8A-8C illustrate one process of extracting unique points from an image. In FIG. 8A, unique points are extracted along a strip like region with correlation score of about 0.5. FIG. 8B illustrates the end of a strip and has a correlation score of about 0.7. FIG. 8C illustrates many round objects being extracted. The correlation score with the round objects is approximately 1, indicating that the round objects highly correlate with the structure (e.g., the cone-like structure) selected for cross-correlating.

Figure 9:
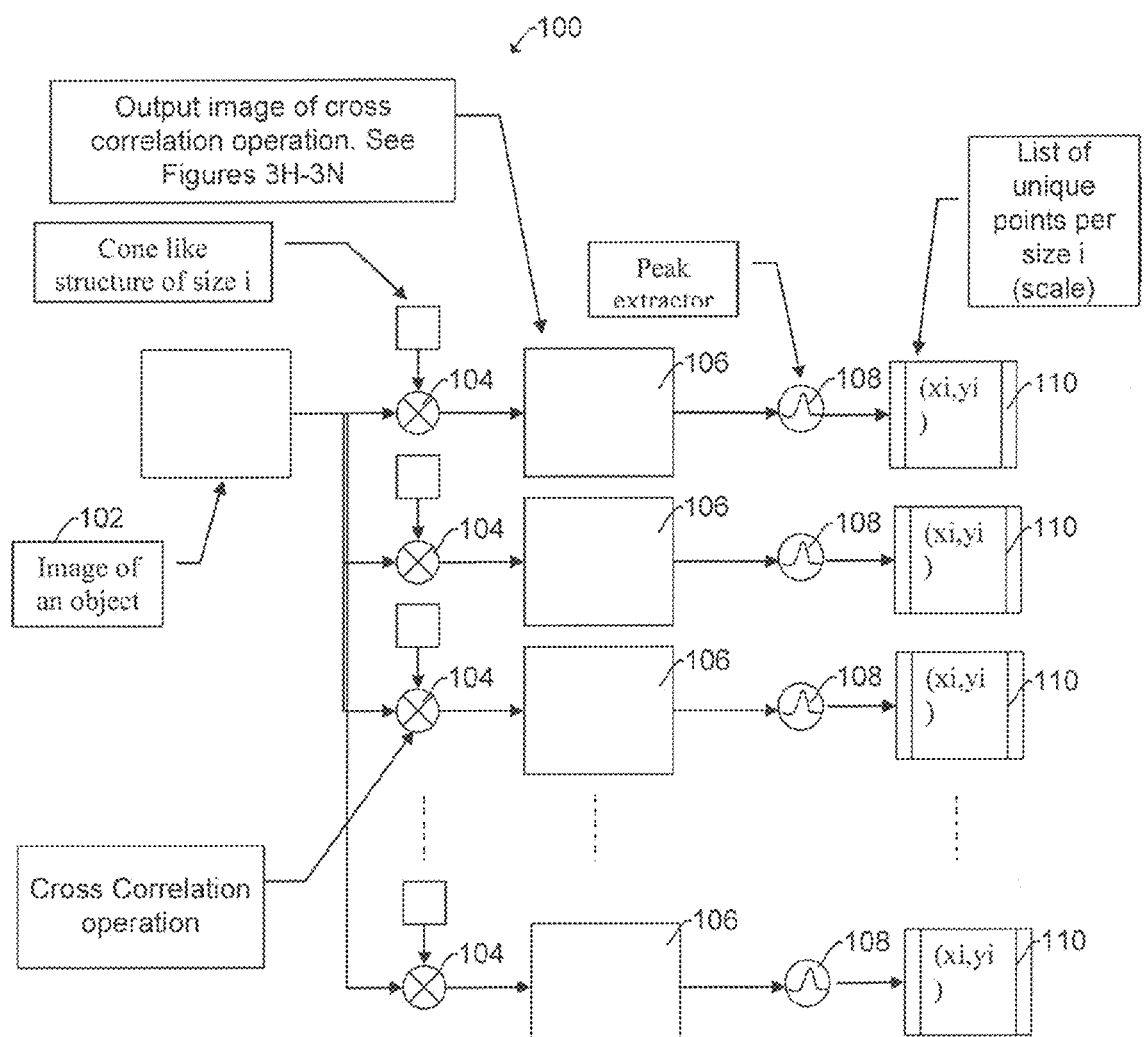

FIG. 9 illustrates one exemplary method 100 for extracting scale and rotation invariant icons from an image. At block 102, an image of an object is provided in electronic form. The image may be in any suitable electronic format (e.g. REG, TIFF, PDF, bitmap, etc.) At block 104, the image of an object is cross-correlated with one or more structures 12 (e.g., cone-like structures), as described above. At block 106, output image of cross-correlation operation is obtained for each of the cross-correlation structures. At block 108, peak values are extracted for each of the cross-correlation structures. At block 110, a list of coordinate points per cross-correlation structure is obtained and stored in a memory.

Figure 10:
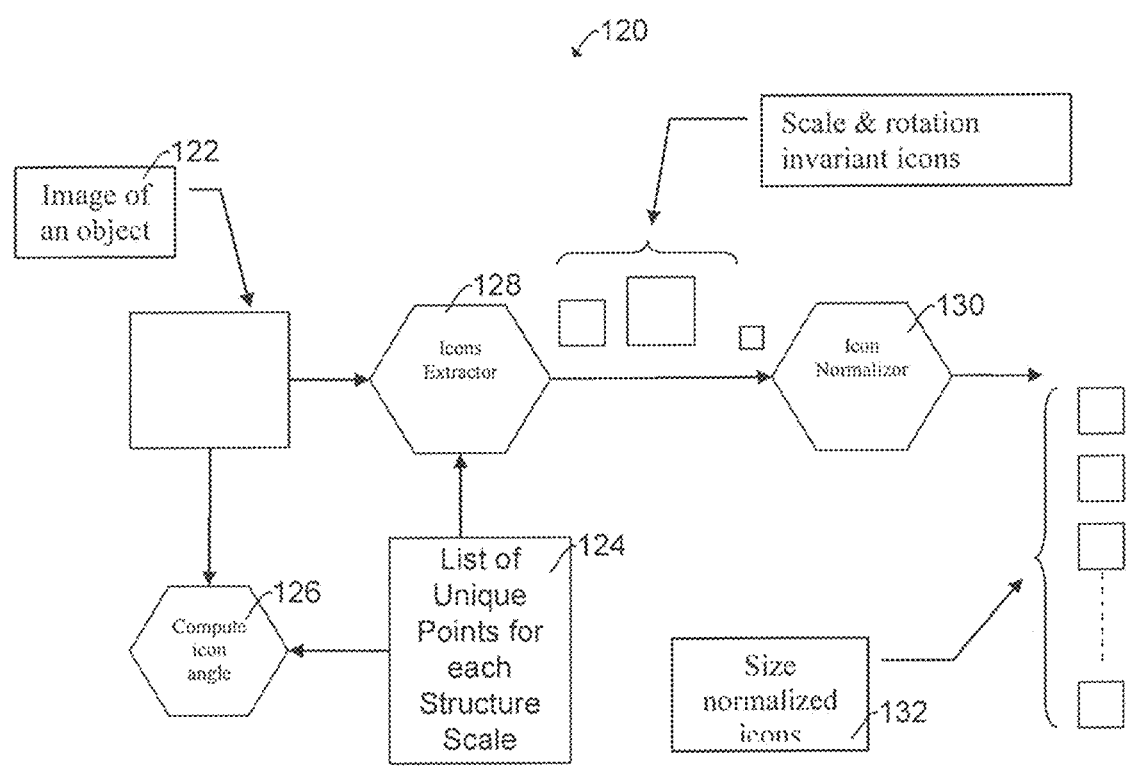

FIG. 10 illustrates one exemplary method 120 for extracting scale and rotation invariant icons from an image. At block 122, an image of an object is provided in electronic form. At block 124, the list of coordinate point per cross-correlation structure is provided. At block 126, the icon angle is generated for each of the icons and stored appropriately for later use at block 128. At block 130, the icons are then normalized by appropriate scaling, as desired. At block 132, the icons are stored in a memory or other electronic storage device.

Figure 11:
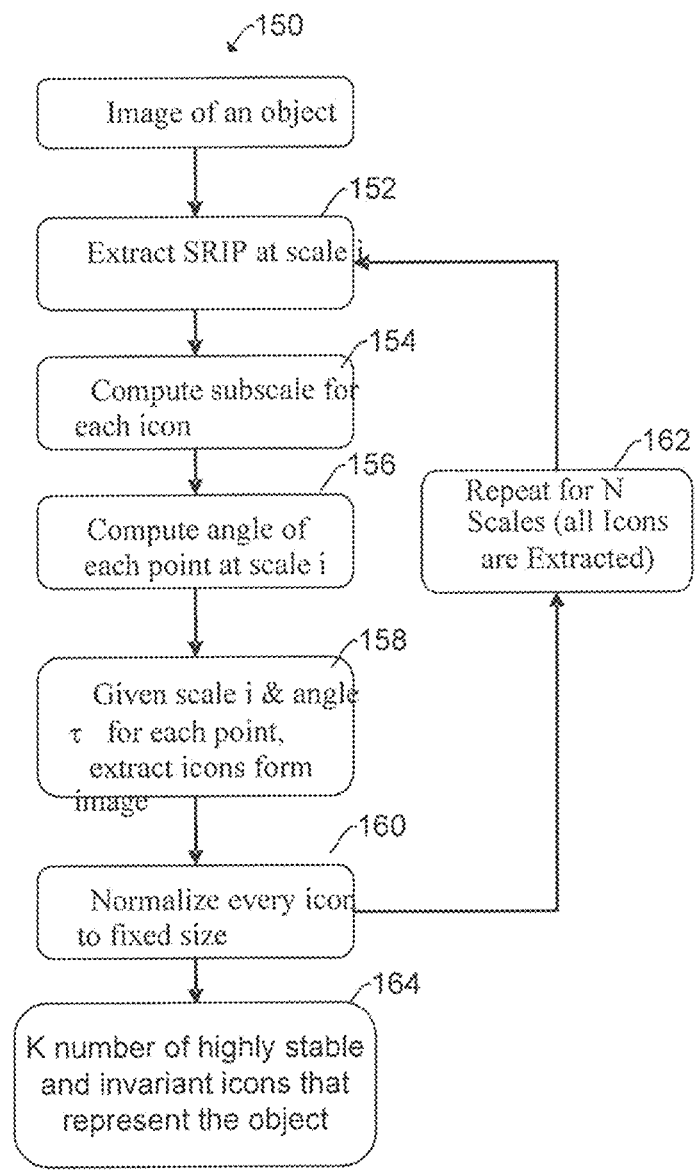

FIG. 11 illustrates another exemplary method 150 for extracting scale and rotation invariant icons from an image. At block 152, an image of an object is provided in electronic form. At block 154, scale rotation invariant points are extracted at a scale. At block 156, a subscale is computed for each icon. An extremum point is usually a peak at a scale and neighboring scales. Therefore, it is possible to compute subscale by taking the peak value at "best scale" and its neighboring scale. The scale of an icon becomes the scale of the cone-like structure plus or minus subscale. A well known method is parabola fit to find its peak in sub-position.

At block 158, the icon for each for each of the coordinates is computed for the scale. At block 160, given the icon angle and scale for each of the coordinates, extract icons from the image. At block 162, the icons are normalized to a fixed size. At block blocks 154 through 160 are repeated until all icons have been extracted. At block 164, a constant (K) of highly stable and invariant icons that represent the object are obtained and may be stored in a memory or other suitable storage device or pumped into an indexing data base or hash table.

An exemplary method 200 for learning an object is illustrated in FIG. 12. At block 202, an image of an object is provided in electronic form. At block 204, an object contour point is extracted from an image of and sampled. The contours points may be used for hypotheses verification and to verify spatial relation between coordinates of unique points. In general, the unique points drive the attention and contour points verify the hypotheses. Sample points from the contour points are selected, which provides a fast verification process.

At block 206, SRI points acquired from the image and/or object to be learned are used to extract icons associated with the SRI points. In one embodiment, each icon has its (x, y) coordinate, size (scale) and angle. At block 208, a descriptor for each icon is created. In addition or in the alternative, each icon may also be tagged or otherwise associated with a learned object name.

At block 210, similar icons are found and tagged. Similar icons are generally suitable for recognition, but not unique enough for locating the object unless the spatial relation between the icons is applied such as, for example, nearest neighbor icon; n nearest neighbors; left, top, bottom, left neighbor; etc. Similar icons may have multiple correspondences. Blocks 202-210 are repeated for every object needed to be learned. Once learned, an object becomes a collection of icons (or their descriptors) and the spatial relation that ties the icons together is a set of object contour points. The icon coordinates also can be used for detecting, determining and/or verifying special relationships between the icons.

Using descriptors provides a variety of advantages. Such advantages include, for example, permitting the use of indexing techniques for fast retrieval of similar icons in a database of icons, which hastens retrieval of similar objects. This functionality is highly desirable when recognizing an object(s) from a large database of objects.

Figure 13:
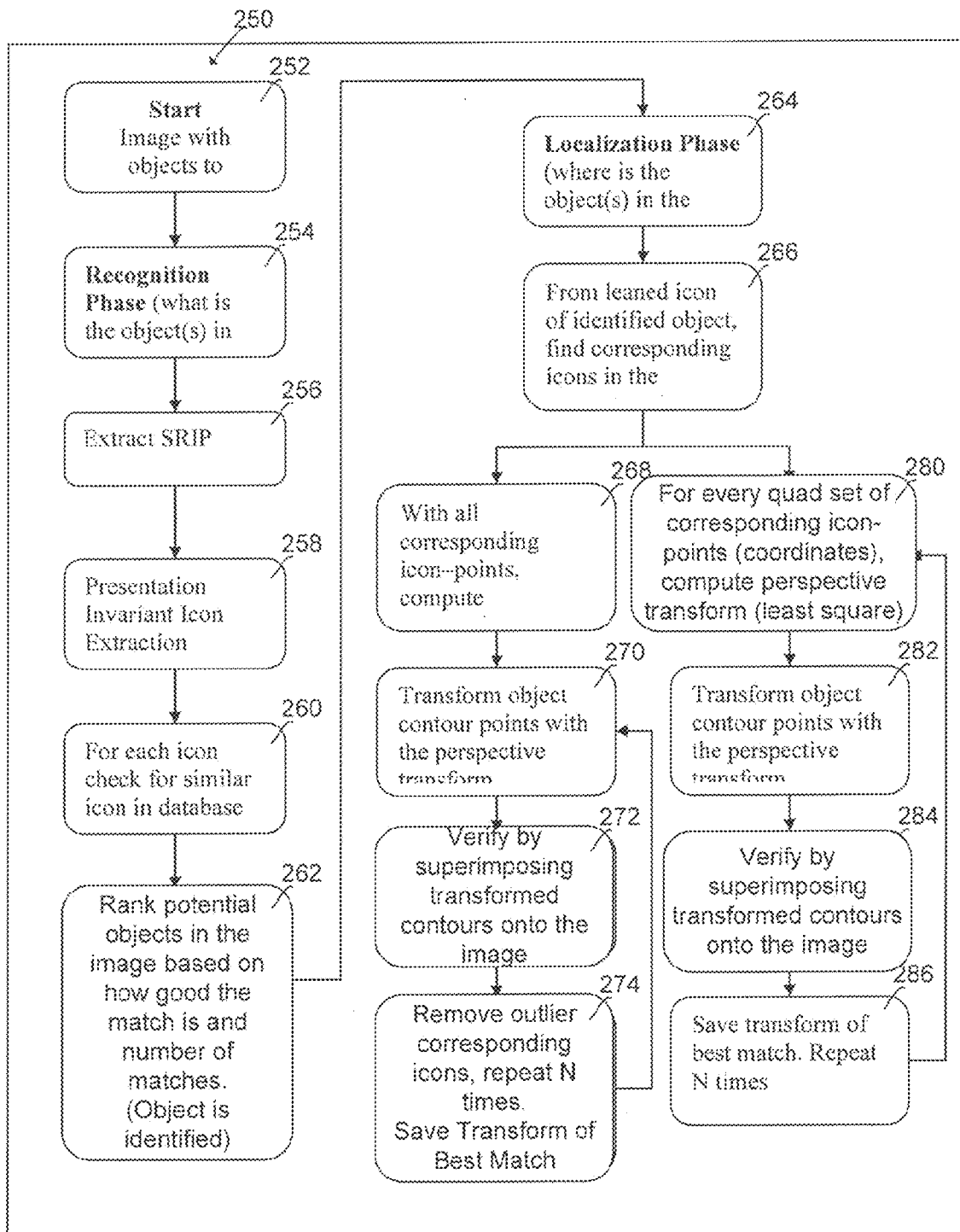

During the recognition phase, an object or multiple objects may exist in an image (scene image) and one goal is to recognize the object or multiple objects and provide the x and y coordinates of each object. An exemplary recognition method 250 is illustrated in FIG. 13. At block 252, an image having one or more objects to identify is provided in electronic form. At block 254, the recognition phase is initialized. At block 256, contour points are extracted from the image and SRI points are extracted from the image. At block 258, icons of the image are extracted at each of the unique points and normalized, as set described above. At block 260, for each extracted icon, a best matched icon is found or otherwise searched for in a database of icons using either a sequential method if number of learned object is small or an indexing method if the number of learned object is large.

At block 262, candidate objects in the image are identified and ranked based on the quality of the match and/or the number of matches. At block 264, the location of the object or objects is determined. At block 266, based on the learned icon or icons of an identified object or objects, corresponding icons in the recognized icons are found. This may be accomplished by a variety of methods.

One exemplary method begins at block 268. At block 268, all corresponding icons are used to compute a perspective transformation. This may be done by generating one or more hypotheses. The hypotheses may be generated in any desired manner. For example, all icons of learned object(s) may be selected, and compared with corresponding matched icons. Using a least square method correlation method or another correlation method, a perspective transform is generated between the learned unique point's coordinates and the corresponding matched points in the scene image. A least squares correlation method is generally preferred because there may be some outliers, at this juncture.

At block 270, the sampled learned contour points of candidate objects are transformed and superimposed on the scene image for verification. A match score between sampled contour and scene contour is computed. The transformation having the best contour match is selected. At block 272, using the transformation of the best match, all unique points of the learned object are transformed with the perspective transform onto the image. In addition, the distance between these transformed points and scene object unique points are computed. At block 274, any outlier corresponding icons are removed and the transform having the best match is saved for later use. Blocks 270 through 274 are repeated N times, where N is the number of corresponding icon points. Once this method has been applied N times, the transform having the best match is saved for later use.

Another method for obtaining precise localization of an icon is illustrated in blocks 280-286. Referring to block 280, for every quad set of corresponding icons points (e.g., coordinates), a perspective transform is computed using least squares or some other correlation method. At block 282, the object contour points with the perspective transform is transformed, in similar manner as block 270. At block 284, transformed contour points are transformed and superimposed onto the image to verify the transform, as discussed above with respect to block 272. At block 286, the transform producing the best match is saved and the process repeats N times (where N is the number of quad sets).

Figure 14A:
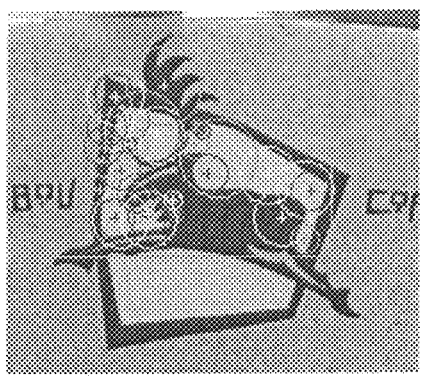
FIGS. 14A-B illustrate exemplary objects having different scales and orientations in accordance with aspects of the present invention.
Figure 14B:
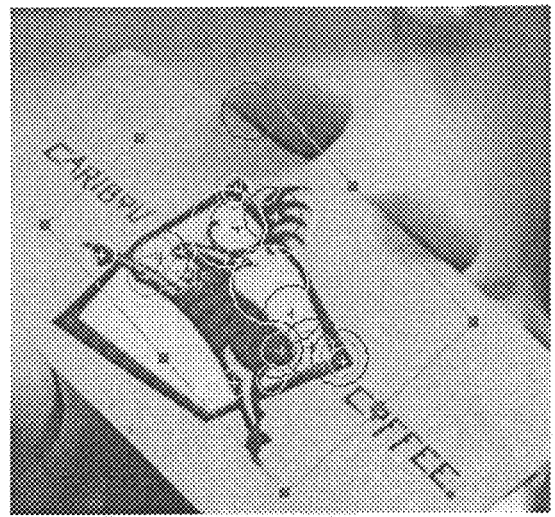

FIGS. 14A and 14B illustrate samples of unique points that are invariant to presentation. For example, FIG. 14A illustrates an object in an image, wherein the image was taken at a relatively close distance to the object and/or the image has been zoomed in around the object. FIG. 14B illustrates an image of the same object taken at a further distance and/or zoomed further out, and rotated, tipped and tilted than the image in FIG. 14A.

In operation, a method of generating the hypotheses picks a predetermined number of points (e.g., four points) of the learned unique points and a predetermined number of corresponding points (e.g., four points) in the scene image. The process is repeated for N number of quad points. For every set of four points the perceptive transform is generated and sampled contour points are transformed and superimposed on the scene contour points. The transform of highest match between learned contours and scene contour is kept as the best transformation transform. For a set of ten matching icons between learned object and found object, there are 210 possible combination and, of course, 210 possible hypotheses generation and verifications. The speed of the recognition process (the entire process) for one learned object is about 140 millisecond using standard off the shelf Pentium based processor with 1.6 GHz processor speed. It is approximately 2 milliseconds extra for every learned object using sequential icon matching. This means, for example, that for 430 learned objects, a recognition would take 1 second ((1000−140)12). A hash table based indexing would have the potential of achieving recognition of a million objects in one second.

As a practical contribution, the aspects of the present invention may be used in a wide variety of applications including, for example, exemplary computer vision applications include: visual object recognition and scene interpretation, particularly for image retrieval, video indexing, controlling processes (e.g. an industrial robot or autonomous vehicle such as unmanned aerial/ground/see vehicle), detecting events (e.g. for visual surveillance), organizing information (e.g. for indexing databases of images and image sequences), image based internet search (e.g., searching for similar image on the Internet), modeling objects or environments (e.g. medical image analysis or topographical modeling), interaction (e.g. as the input to a device for computer-human interaction), applications wherein a closed-loop guidance and/or control system is utilized that requires a fast searching algorithm, etc.

Figure 15:
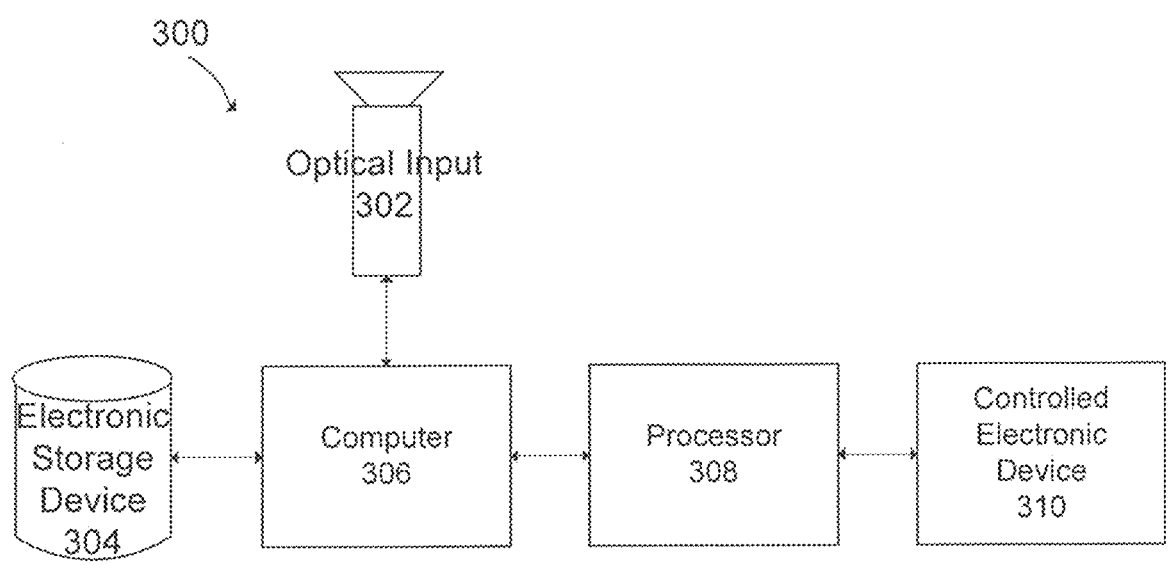
FIG. 15 is a block diagram of a system in accordance with aspects of the present invention.

FIG. 15 illustrates an exemplary feedback system 300 that may be used in accordance with the aspects of the present invention. The system 300 may include an optical input device 302 (e.g., a CCD camera) and/or an electronic storage device 304 for providing a learned image and/or a target image to a processor 306. The output of the devices 302, 304 may be input to a processor 306 that has computer code that is functional to carry out the desired functionality. The processor 306 may generate a control signal to a controller 308 (e.g., programmable logic controller) that may be used to control one or more electronic devices 310 (e.g., vehicle navigation system, tracking system, etc.). A feedback signal may be generated by the electronic device 310 to the controller 308 and/or processor 306 in order to control the particular application in which the invention is being applied.

Figure 16:
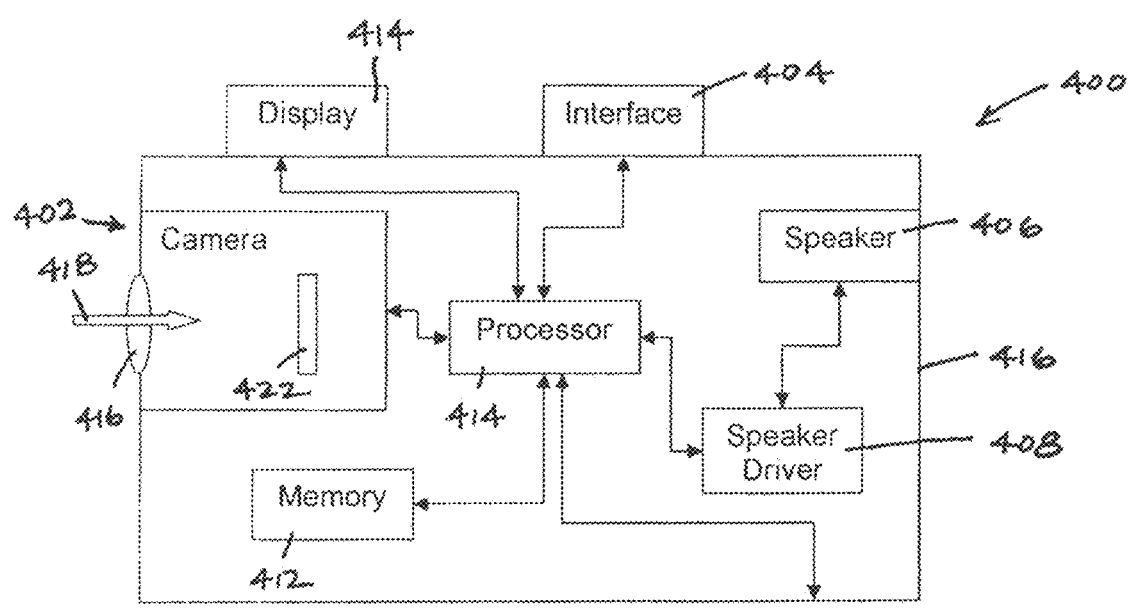
FIG. 16 is a block diagram of a visual recognition system.
Figure 17:
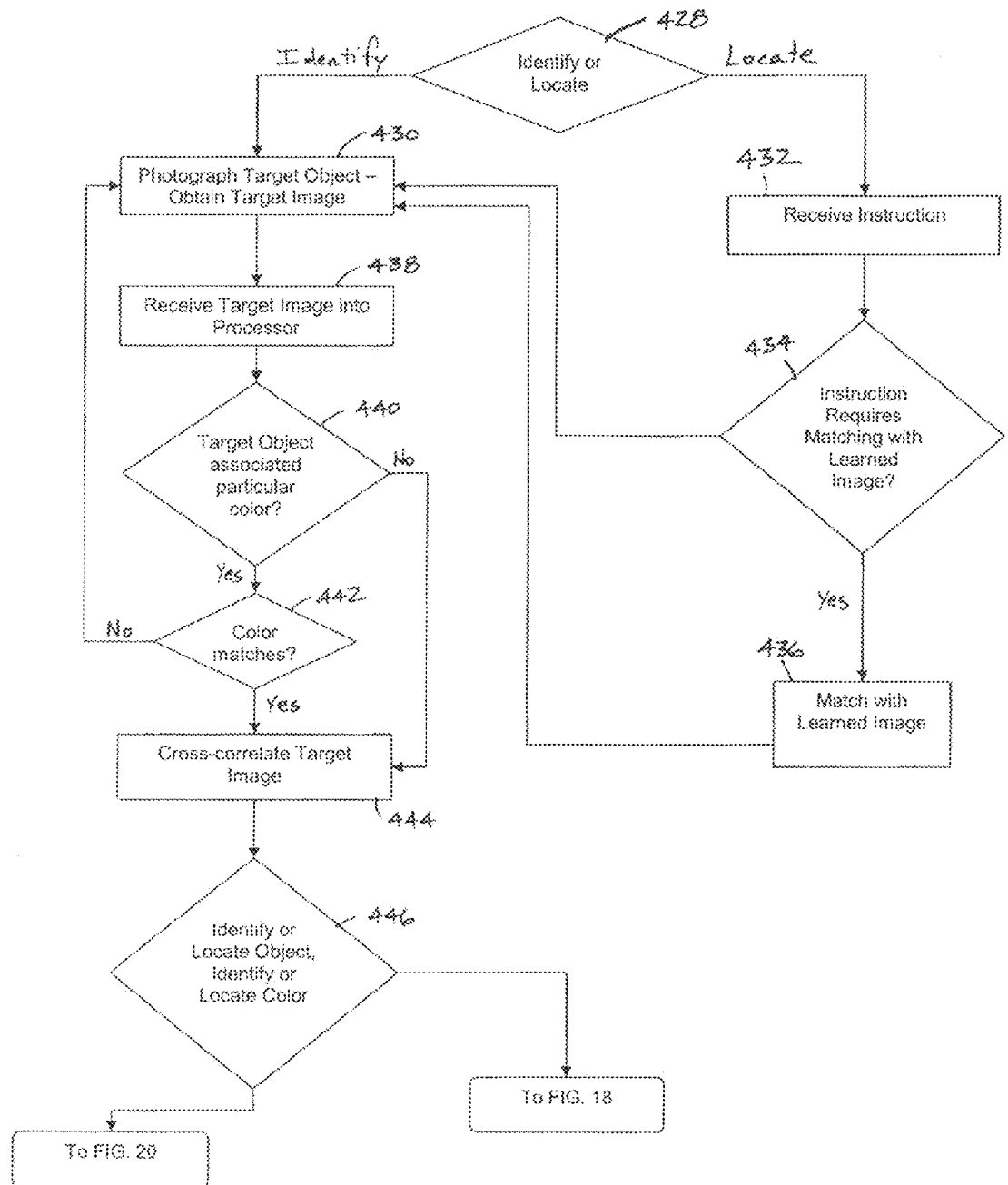
FIGS. 17-20 are flow diagrams depicting a method for generating a signal based on a visual image.

The visual recognition systems and methods described above can be useful for providing information to blind persons. Since the systems and methods described above can visually recognize objects in a very fast manner, these systems and methods can be implemented within a device or system that can aid a blind person. The aforementioned systems and methods can be useful by providing an indication to a blind person with regard to money. For example, a device can be provided in which a photograph images are taken of a particular note, e.g. a $20 bill, and the device can provide an audible indication to the blind individual that he has photographed the particular note. Also, the aforementioned visual recognition systems and methods can also be useful to allow a blind individual to locate certain objects. The aforementioned visual recognition systems and methods can also be useful in providing information such as pattern and color for clothing and providing this information as an audible signal to a blind individual. The aforementioned visual recognition systems and methods can also be useful to provide other information to a blind individual. Reference will now be made to FIGS. 16 and 17, which depict a system and method for generating a signal based on a visual image.

FIG. 16 schematically depicts a visual recognition system 400 that can be used to generate a signal based on a visual image. The visual recognition system 400 generally includes a camera 402, an interface 404, a speaker 406, a speaker driver 408, a memory 412, and a processor 414. The visual recognition system 400 can further include a display 414. The camera 402, speaker 406, the speaker driver 408, the memory 412 and the processor 414 can be located inside a housing 416. The interface 404 can mount to the housing so as to be accessible from an exterior of the housing. The display 414, which can be a known LCD/LED display (or similar display), can also mount to the housing so as to be visible from an exterior of the housing. The camera 402 can be similar to known digital cameras and can include a lens 416 that also mounts to the housing such that light, depicted by arrow 418 can enter into the camera 402 and contact a sensor 422. The housing 416 can be small enough so as to be hand held by the individual using the visual recognition system 400. Alternatively, the processor 414 can be located on a separate computer and the camera 402 can communicate with the computer, either wirelessly or the camera can be hard-wired to the computer containing the processor.

The visual recognition system 400 depicted in FIG. 16 is useful in a method for generating a signal based on a visual image. The visual recognition system 400 can be used to identify an object, e.g., identify a $20 bill, and/or to locate an object, e.g., locate a box of cereal on a shelf. The aforementioned are simply examples of objects that can be identified or located using the visual recognition system. It is also to be appreciated that the flow charts in FIGS. 17-20 are provided for understanding embodiments of the system and method, however, the appended claims are not limited to the arrangement or order of steps shown in the figures.

With reference to FIG. 17, the method for generating a signal based on a visual image includes, at 428, determining whether the visual recognition system 400 (FIG. 16) will be used to identify or locate. If the visual recognition system is used to identify something, e.g. an object, a color or a pattern, photographing a target object with the digital camera 402 (FIG. 16) to obtain a target image is performed at 430. If the visual recognition system is to be used to locate an object, a color or a pattern, then receiving instructions is performed at 432. When instructions have been received, the system can then determine if the instruction that was received requires matching with a learned image at 434. As discussed above, the learned images can be stored in the memory 412 (FIG. 16). If the received instruction requires matching, then at 436, the received instructions can be matched with a learned image. This will be described in more detail below. The system can then proceed to 430 where the target image is photographed and the target image is obtained. If the instruction does not require matching, then the system can then proceed to 430 where the target image is photographed and the target image is obtained. For example and with reference back to FIG. 16, an individual can operate the camera 402 by way of the interface 404, where the visual recognition system 400 is located in a hand held device within the housing 416.

Alternatively, when the camera 402 is connected to another computer that includes the processor 414, the camera could include an interface that would allow one to photograph a target object to obtain a target image.

After the target image has been obtained, then at 438 the target image is received into the processor 414 (FIG. 16). As with the embodiments discussed above, the target image may be in any suitable electronic format (e.g., JPEG, TIFF, PDF, bitmap, etc.) At 440, a determination can be made as to whether a target object that is to be located is associated with a particular color. The memory 412 can store colors associated with different items or objects that are to be located using the system. For example, if a blind individual is searching for a twelve pack of Coca-Cola® beverages, the twelve pack is typically packaged in a red box. If the received image, from step 430, does not contain any red within the image, then the received image can be assumed to not be a twelve pack of Coca-Cola® beverages. Accordingly, the process determines whether a target object is associated with a particular color, at 440, and if the target image does not contain the particular color, e.g. if the target image does not contain any red, at 442, then another photograph is taken and another target object is received at 430. If the target object is not associated with a particular color, at 440, or the color in the target image includes the particular color (or similar shade), at 442, then the target image is cross-correlated with a structure having a variety of scales across the target image at 444. This has been described with much detail above, therefore, further description is not provided herein. By cross-correlating only the target images that include a particular color, when a particular color can be associated with the target object, the process can proceed more quickly by not having to cross-correlate each received image.

At 446 it is determined whether the system 400 is (1) to identify or locate an object (e.g., identify a $20 bill), to identify or locate a color, or (2) to identify or locate something else, such as a pattern.

The method for generating a signal based on a visual image can further include, at 448 (see FIGS. 18-20), generating a signal for output on a device associated with the camera 402 based on cross-correlating the target image. Based on the signal that is to be generated and whether the system is to be used to identify an object, a color or a pattern or the system is to be used to locate an object, a color or a pattern, the method for providing the signal can follow different paths and/or algorithms. Where the recognition system is used by a blind (or sight impaired) individual, the signal can include an audible signal indicating an identification of the target image, as well as a tactile-type signal where the device that is held by the blind individual shakes or provides a touch sensory indication. The signal that is generated at 448 can also provide information useful to an individual in locating an object.

Where the system 400 (FIG. 16) is used to (1) identify or locate and object, or (2) to identify or locate a color, the method for generating a signal based on a visual image can further include, at 450, extracting icons from a coordinate generated by cross-correlating the target image. Extracting icons from the target image has been described with much detail above, therefore, further description is not provided herein.

It can then be determined, at 452, whether the system is to identify or locate a color. This can be based on the instructions received at 432 (see FIG. 17). Where the system is to identify or locate a color, then the process proceeds to FIG. 19, which will be described in more detail below. Where the system 400 (FIG. 16) is not to identify or locate a color, which is based on the instruction received at 432 (FIG. 17), then the system proceeds to normalizing each icon to a predetermined constant size, at 454, and comparing at least one normalized icon to stored icons associated with learned images to determine a match, at 456. At 458, it is determined whether a match has been located. If a match has not been located, then at 448 a signal is generated indicating no match. If a match is located, then at 462 it is determined whether the system is to determine the distance between the target object and the camera. If the distance between the camera 402 (FIG. 16) and the target object is to be calculated, then the process proceeds to computing the distance between the camera and the target object at 464. If the distance between the camera 402 (FIG. 16) and the target object is not to be calculated, then the process proceeds to generating a signal at 448.

For example when identifying an object, where the operator of the visual recognition system 400 (FIG. 16) photographs a $20 bill (step 430 in FIG. 17), an image of the $20 bill is received into the processor (step 430 in FIG. 17) through the sensor 422 (FIG. 16). In the processor 414 (FIG. 16), the target image is then cross-correlated (step 442 in FIG. 17) with the structure having a variety of scales across the target image. Examples of this have been described above with reference to FIGS. 3A-3G. Moving to FIG. 18, icons are then extracted, at 448, which has been described with reference to FIGS. 6A and 6B. The icons can then be normalized to a predetermined constant size, at 454, which has been described with reference to FIG. 5. At least one of the normalized icons is then compared to stored icons associated with a learned image at 456. The memory 412 (FIG. 16) can store a plurality of icons each associated with a learned image. Accordingly, the learned icons associated with a $20 bill are stored in the memory 412. The target image that was obtained of the $20 bill, i.e. at step 430, can be compared to the learned image of the $20 bill to determine a match. By determining that the target image of a $20 bill matches the learned image of a $20 bill, an output signal can be generated, at 448, wherein the signal includes an audible signal indicating the learned image that matches the target image. For example, the processor 414 (FIG. 16) can communicate with the speaker driver 408 (FIG. 16) to provide an audible message "$20 bill" for output on the speaker 406 (FIG. 16). As discussed above, the target object can be photographed at a further distance and/or zoomed further out, and rotated, tipped and tilted as compared to the learned image, but the visual recognition method and system that has been described above is able to determine whether the target image matches a learned image despite the changes in orientation.

It can be additionally beneficial to compare the normalized icons to stored icons, at 456, only with stored icons associated with learned images that include a particular color as compared to the entire universe of icons stored within the memory 412. With reference back to the example above, if the individual using the system is attempting to locate the twelve pack of Coca-Cola® beverages, the normalized icons can be compared with stored icons associated with stored images that include red within the image. This can greatly reduce the time required for comparison to determine a match.

The method for generating a signal based on a visual image can also be used to locate an object. As explained above, at 428, a determination can be made as to whether the visual recognition system 400 (FIG. 16) will be used to identify or to locate. With reference back to FIG. 17, if the visual recognition system 400 (FIG. 16) will be used to locate an object, at 432, the system 400 can receive instructions as to the object that is to be located. Locating an object will be described with reference to locating a cereal box, however, it should be understood that the system is useful in locating other objects, so long as the memory 412 (FIG. 16) of the system includes a learned image associated with the object that is to be located. At 432, for example, the user of the system can input instructions to locate a certain brand of cereal, e.g. Cheerios® brand cereal. In such an example, the user of the system could, using the interface 404 (FIG. 16), which could be adapted to receive voice commands, speak the word "Cheerios." The processor 414 (FIG. 16) could be programmed to include voice recognition software to recognize the word "Cheerios" (as well as other words for which learned images have been stored in the memory 412 (FIG. 16)).

Figure 18:
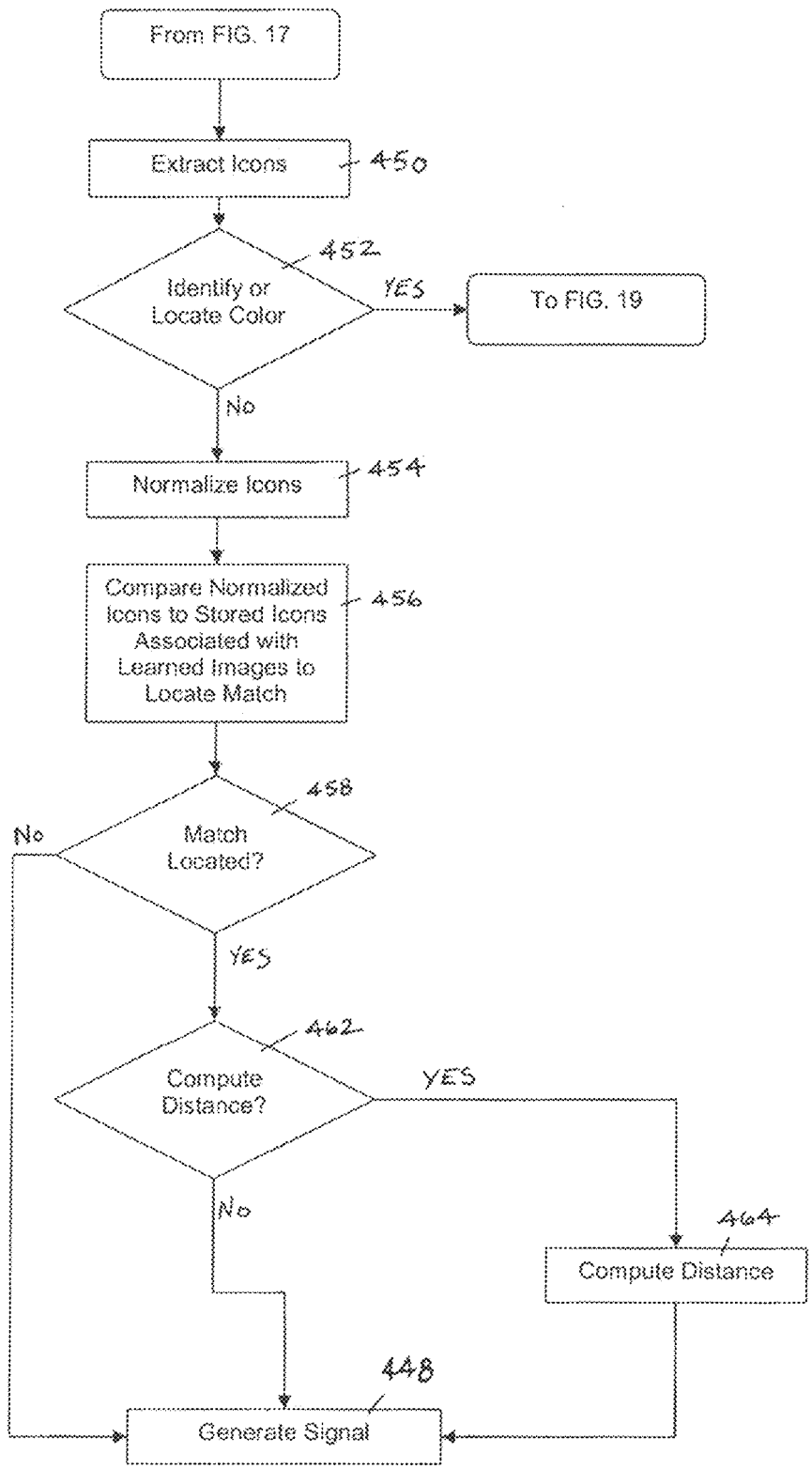

At 436, the instructions that were received above (step 432) can be matched with a learned image. How the system learns images has been described above, therefore, further description thereof in this section has been omitted. Although not shown in the flow diagram depicted in FIG. 17, if the system 400 does not have learned image associated with the instructions that were received at step 432, then an error message could be output through the speaker 406 (FIG. 16). For example, if the memory did not include a learned image associated with Cheerios® brand cereal, then an error signal, which could be an audible signal, could be output indicating that the system has no match for the object that is to be located. The system 400 could also be equipped so as to learn objects by learning objects in a manner that has been described above.

Where the memory 412 (FIG. 16) includes a match for the received instruction, the method for generating a signal based on a visual image then moves to 430 where a photograph is taken of a target object to obtain a target image. Similar to known digital cameras, the camera 402 (FIG. 16) would not have to take individual photographs, but instead could simply pan over the target area gathering images without requiring an individual to "take" a photograph by pressing any button. At 438, the target image is received from the camera 402 into the processor 414. At 440, the determination can be made as to whether the target object is associated with a particular color, e.g., the color yellow could be associated with "Cheerios" in the memory 412. The target image is cross-correlated with a structure having a variety of scales across the target image at 444. With reference now to FIG. 18, at 450, icons from a coordinate generated by cross-correlating the target image can be extracted, and each icon can be normalized to a predetermined constant size, at 454. At least one normalized icon can be compared to stored icons associated with learned images to determine a match, at 456. Again, if the target object is associated with a particular color, the normalized icons can be compared with stored icons associated only with learned images that include the color yellow. When the target image matches the desired learned image, i.e., when the target image is a box of Cheerios® brand cereal, the method for generating a signal based on a visual image continues, at 464, by computing a distance between the target object and the camera 402 based on comparing at least one normalized icon (from step 456) to at least one stored icon from a learned image that matches the target image. The distance between the target object, i.e., the object that has been photographed, and the camera 402 (FIG. 16) can be computed because the focal length of the lens 416 (FIG. 16) and the size of the sensor 422 (FIG. 16) are known. With reference back to FIG. 16, the camera 402 includes the lens 416, which has a predetermined focal length. The camera 402 also includes the sensor 422, which has a predetermined size. Where the target object is photographed by the camera 404 to obtain the target image, by comparing the normalized icons to stored icons associated with learned images to locate a match and where a match has been located, the distance between the camera 402 and the target object 404 can be determined.

For example, where a person is using the recognition system 400 to locate a box of cereal on a shelf, the recognition system 400 would include learned images associated with the surfaces of cereal boxes that are facing outwards and towards the camera. The operator of the system 400 would face the camera lens 416 toward the shelf having the cereal boxes and photograph the cereal boxes on the shelf. Again, individual photographs of the cereal boxes on the shelf would not have to be taken; instead one using the camera 402 could simply pan the camera over the shelf. Where a certain type of cereal is desired by the user of the system 400, an input can be made through the interface 404, which can also be configured to receive voice inputs, such that the system knows the desired type of cereal from among other items on the same shelf. When an image is photographed that includes the target image that matches a learned image of the desired box of cereal, the system can then generate an output signal at the speaker 406 indicating the distance between the target object and the camera 402 based on information from the extracted icons (from step 448) as well as the focal length of the lens 416 and the size of the sensor 422. Accordingly, the signal that is generated at 436 can include an audible signal indicating the distance between and a direction towards or from the target object and the camera 402. Tactile feedback, e.g. vibrations of the housing 416 (using a known vibration device in communication with the processor 414) could also be provided.

Figure 19:
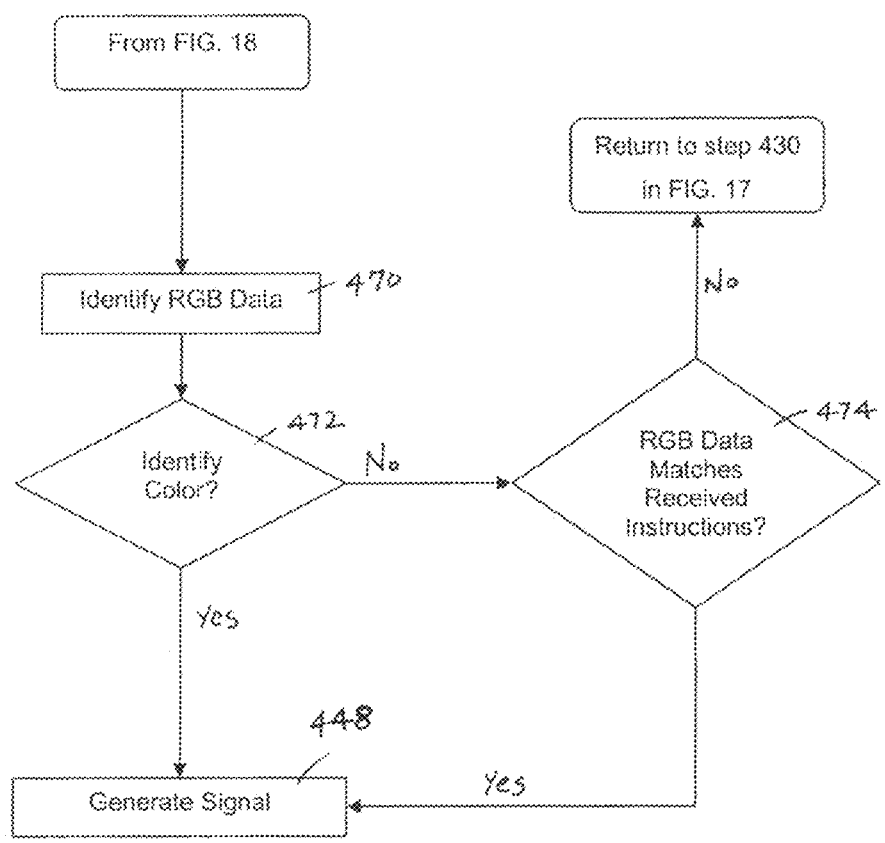

The method for generating a signal based on a visual image can also be useful in providing data regarding the color of an object. For example, it can be desirable for a blind individual to know the color of a shirt or blouse that may be worn that day. With reference to FIG. 17, where the system is used to identify the color of a target object, e.g., the shirt or blouse, the target object can be photographed at 430 and the target image can be received into the processor 414 (FIG. 16) at 438. The target image can then be cross-correlated with the structure having a variety of scales across the target image, at 442. With reference to FIG. 18, the method can further include extracting at least one icon from a coordinate generated by cross-correlating the target image at 438. With reference to FIG. 19, the process can proceed to, at 470, identifying RGB data for at least one location within the extracted icon. A higher red content within the icon, would correlate to higher "R" value, a higher green content within the icon would result in a higher "G" value and a higher blue content within the icon would result in a higher "B" value. Software and/or hardware can be provided on the processor 414 (FIG. 16) including algorithms such that a mixture across the RGB data can be extrapolated to coincide with a color within the extracted icon. Known analysis and methods can be employed to determine the predominant color within the extracted icon. Identifying RGB data, at 476, can also include identifying RGB data for at least two locations within the extracted icon, a first location being adjacent a centroid of the icon and a second location being adjacent a peripheral edge of the icon. Upon deciphering the color content within the extracted icon, a signal can be generated at 448 where the signal includes an indication of at least one color found on the target object based on the RGB data. Even though extracting icons is shown at 450 in FIG. 18 prior to determining whether the system is to be used to identify or locate a color, at 452, RGB data can be determined for the entire received image (from 430 in FIG. 17) without cross-correlating the target image or extracting any icons. For example, the camera 402 could be used to determine the color of an entire target object and a signal can be generated that is an indication of the color of the target object.

The identification of RGB data could be useful to identify the color of an object, as described above, as well as to locate an object of a particular color. For example and with reference back to FIG. 17, the method for generating a signal based on a visual image can begin at 428 where the operator chooses that an object of a certain color be located. At 432, an instruction can be received by the processor 414 (FIG. 16) via the interface 404 (FIG. 16) to locate, for example, an object having the color red. With reference to FIG. 17, since the color red need not be associated with a particular object, the instruction that was received does not require matching with a learned image, so the process proceeds to photographing a target object at 430. A photograph is then taken at 430 to obtain a target image. The target image is received in the processor at 430 and is cross-correlated at 442. With reference to FIG. 18, icons are then extracted at 448 and, as seen in FIG. 19 the RGB data is identified at 470. A determination is then made as to whether a color is to be located, as opposed to identified, at 472. Since the operator wishes to locate a color, per the instructions received at 432 (FIG. 17), the process proceeds to 474 to determine whether the RGB data matches the received instruction. In other words, has the an object of the desired color been photographed? If the RGB data matches the received instructions, at 474, then a signal is generated at 448 that the color has been located. If the RGB data does not match the received instructions from 448, then the method reverts to step 430 in FIG. 17. Again, the RGB data can be determined for the entire received image (from 430 in FIG. 17) without cross-correlating the target image or extracting any icons. For example, the camera 402 could be used to locate a target object of a particular color and a signal can be generated that is an indication that target object having that color has been located.

Figure 20:
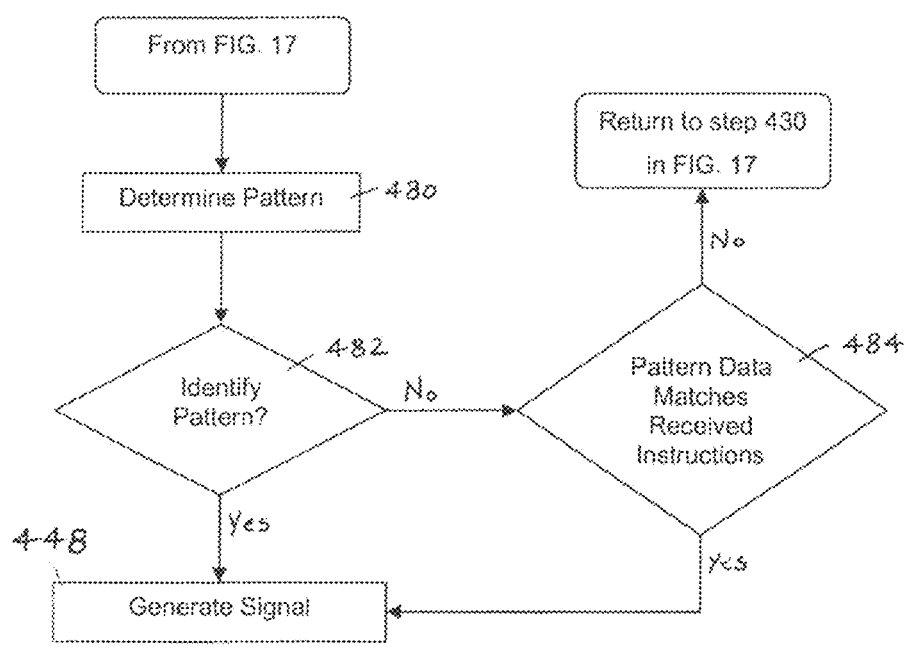

Visual recognition system 400 can also be useful in identifying the pattern found on a target object or locating a pattern on a target object. For example, it can be desirable for a blind individual to know the pattern of a shirt or blouse that may be worn that day. With reference to FIG. 17, where the system is used to identify the pattern of a target object, e.g., the shirt or blouse, the target object can be photographed at 430 and the target image can be received into the processor 414 (FIG. 16) at 438. The target image can then be cross-correlated with the structure having a variety of scales across the target image, at 442. As discussed above, cross-correlating the target image with a structure having a variety of scales across the image locates extremum coordinates. With reference to FIG. 20, based on these extremum coordinates, a pattern on the target object can be able to be deduced or determined at 480. For example, where the extremum coordinates coincide with a checker-shaped pattern, a signal can be generated at 448 to indicate that the target image includes a checker-shaped pattern. Vertical stripes and horizontal stripes can also be determined by cross-correlating the target image with the structure having a variety of scales and/or computing the icon vector, which has been described above.

The identification of a pattern could be useful to identify the pattern on an object, as described above, as well as to locate an object having a particular pattern. For example and with reference back to FIG. 17, the method for generating a signal based on a visual image can begin at 428 where the operator chooses that an object of a certain pattern be located. At 432, an instruction can be received by the processor 414 (FIG. 16) via the interface 404 (FIG. 16) to locate, for example, an object having a particular pattern. With reference to FIG. 17, since a pattern need not be associated with a particular object, the instruction that was received does not require matching with a learned image, so the process proceeds to photographing a target object at 430. A photograph is then taken at 430 to obtain a target image. The target image is received in the processor at 430 and is cross-correlated at 442. With reference to FIG. 20, a determination is then made as to whether a pattern is to be located, as opposed to identified, at 482. Since the operator wishes to locate a pattern, per the instructions received at 432, the process proceeds to 484 to determine whether the pattern in the target image matches the received instruction. In other words, has an object having the desired pattern been photographed? If the pattern matches the received instructions, at 484, then a signal is generated at 448 that the pattern has been located. If the pattern does not match the received instructions from 448, then the method reverts to step 430 in FIG. 17.

The system 400 can also be programmed so as to learn images, which has been described above with reference to FIG. 9. The interface 404 can be configured to cooperate with the processor 414 to "name" objects when photographs of these objects have been taken by the camera 402. This can allow for customization of the device for the individual using the device.

Accordingly, the visual recognition systems and methods described above can be useful to provide information to blind individuals by providing an audible or tactile signal based on a visual image. Even though only certain methods and systems were described above, it should be understood that the appended claims should not be limited to only those embodiments described above. Instead, the appended claims should be construed broadly to include all equivalent structures that can be defined by the appended claims and the equivalents thereof.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". It should also be noted that although the specification lists method steps occurring in a particular order, these steps may be executed in any order, or at the same time.

The invention claimed is:

1. A method for generating a signal based on a visual image, the method comprising:
   photographing a target object with a digital camera to obtain a target image;
   receiving the target image into a processor that is in communication with the camera;
   cross-correlating the target image with a plurality of structures each having a different radius value across the target image to generate coordinate points;
   extracting icons from the coordinate points generated by the cross-correlating of the target image, wherein the extracted icon size is proportional to the respective radius value of the structure having a predetermined cross-correlation match value;
   normalizing each icon to a predetermined constant size;
   comparing at least one normalized icon to stored icons associated with learned images to determine a match; and
   generating a signal for output on a device associated with the camera.

2. The method of claim 1, wherein signal includes an audible signal indicating the learned image that matches the target image.

3. The method of claim 1, wherein the camera includes a lens having a predetermined focal length and a sensor having a predetermined size, the method further comprising:
   computing a distance between the target object and the camera based on whether a match is determined when comparing the at least one normalized icon to at least one stored icon from a learned image that matches the target image and further based on the focal length and size of the sensor, wherein the signal includes an audible signal indicating the distance between the target object and the camera or a direction that the camera is located with respect to the target object.

4. The method of claim 1, further comprising:
   identifying RGB data for at least one location within the target, wherein the signal includes an indication of at least one color found on the target object based on the RGB data.

5. The method of claim 4, further comprising:
   identifying RGB data for at least two locations within the extracted icon, a first location being adjacent a centroid of the extracted icon and a second location being adjacent a peripheral edge of the extracted icon, wherein the signal includes an indication of at least one color found on the target object based on the RGB data.

6. The method of claim 1, further comprising:
   determining a pattern on the target object based on cross-correlating the target image, wherein the signal includes an indication of the pattern on the target object.

7. The method of claim 1, wherein cross-correlating the target image generates at least one coordinate corresponding to an extremum in the target image.

8. A recognition system comprising:
   a camera;
   an interface configured for receiving commands from an operator of the recognition system;
   a speaker;
   a speaker driver in communication with the speaker;
   a memory;
   a processor in electrical communication with the camera, the interface, the speaker driver and the memory, wherein the processor is programmed so as to receive a target image of a target object from the camera, to cross-correlate the target image with a plurality of structures each having a different radius value across the target image to generate coordinate points, and to extract icons from the coordinate points generated by cross-correlating the target image, wherein the extracted icon size is proportional to the respective radius value of the structure having a predetermined cross-correlation match value.

9. The system of claim 8, further comprising a housing, wherein the camera, the speaker, the speaker driver, the memory and the processor are disposed within the housing and the interface mounts to the housing so as to be accessible from an exterior of the housing.

10. The system of claim 8, wherein the processor is programmed to cross-correlate the target image locating extremum points on the target image and to extract icons from the target image based on the extremum points.

11. The system of claim 10, wherein the processor is programmed to normalize each extracted icon to a fixed constant size.

12. The system of claim 11, wherein the camera includes a lens having a predetermined focal length and a sensor, wherein the processor is programmed to compute a distance between the target object and the camera based on comparing the normalized icons to stored icons from at least one learned image that matches the target image.

13. The system of claim 12, wherein the processor is programmed to output a signal to the speaker driver, wherein the signal includes an audible signal indicating the distance between the target object and the camera.

14. The system of claim 8, wherein the processor is programmed to identify RGB data for at least one location within the target image and to output a signal to the speaker driver, wherein the signal includes an indication of at least one color found on the target object based on the RGB data.

15. The system of claim 8, wherein the processor is programmed to determine a pattern on the target object based on cross-correlating the target image and to output a signal to the speaker driver, wherein the signal includes an indication of the pattern on the target object.

* * * * *